Aug. 12, 1952 R. R. TEETOR 2,606,800
PISTON RING
Filed Nov. 4, 1947 2 SHEETS—SHEET 2
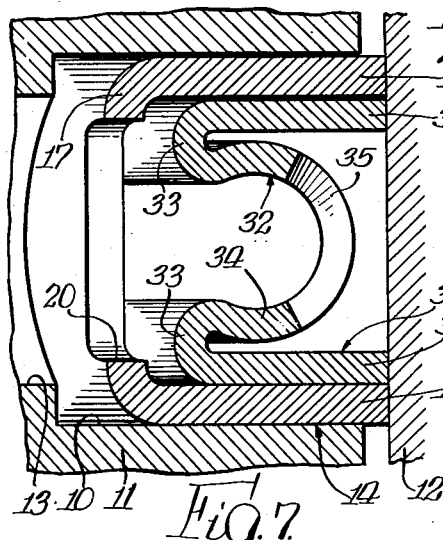
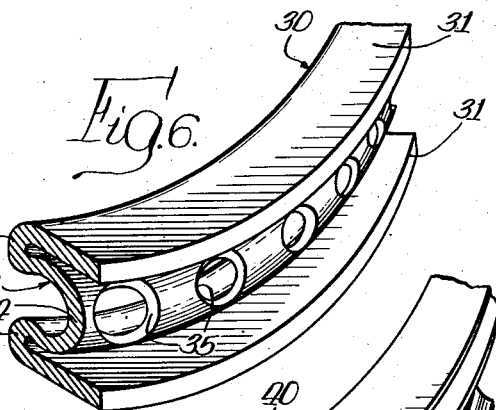
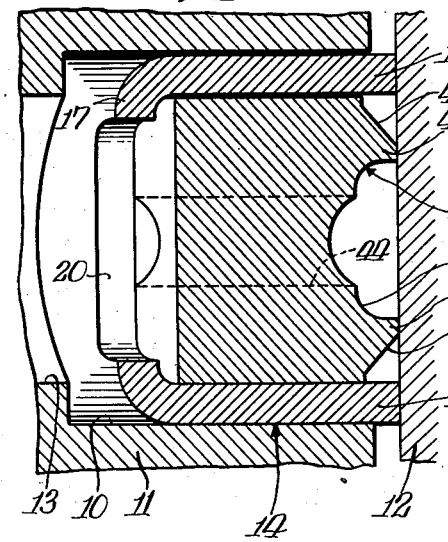
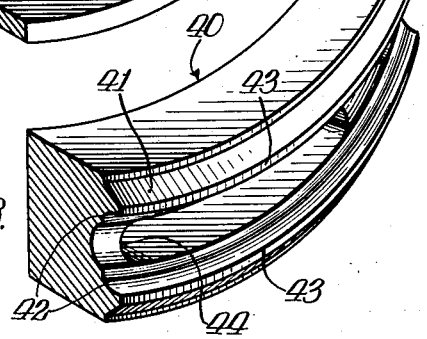
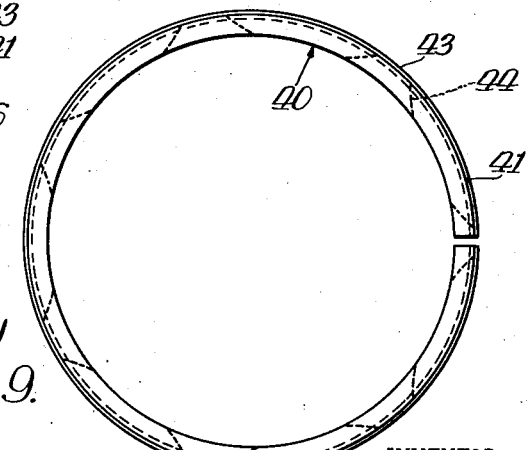
INVENTOR.
Ralph R. Teetor,
BY Davis, Lindsey, Hibben + Noyes
Attys Patented Aug. 12, 1952

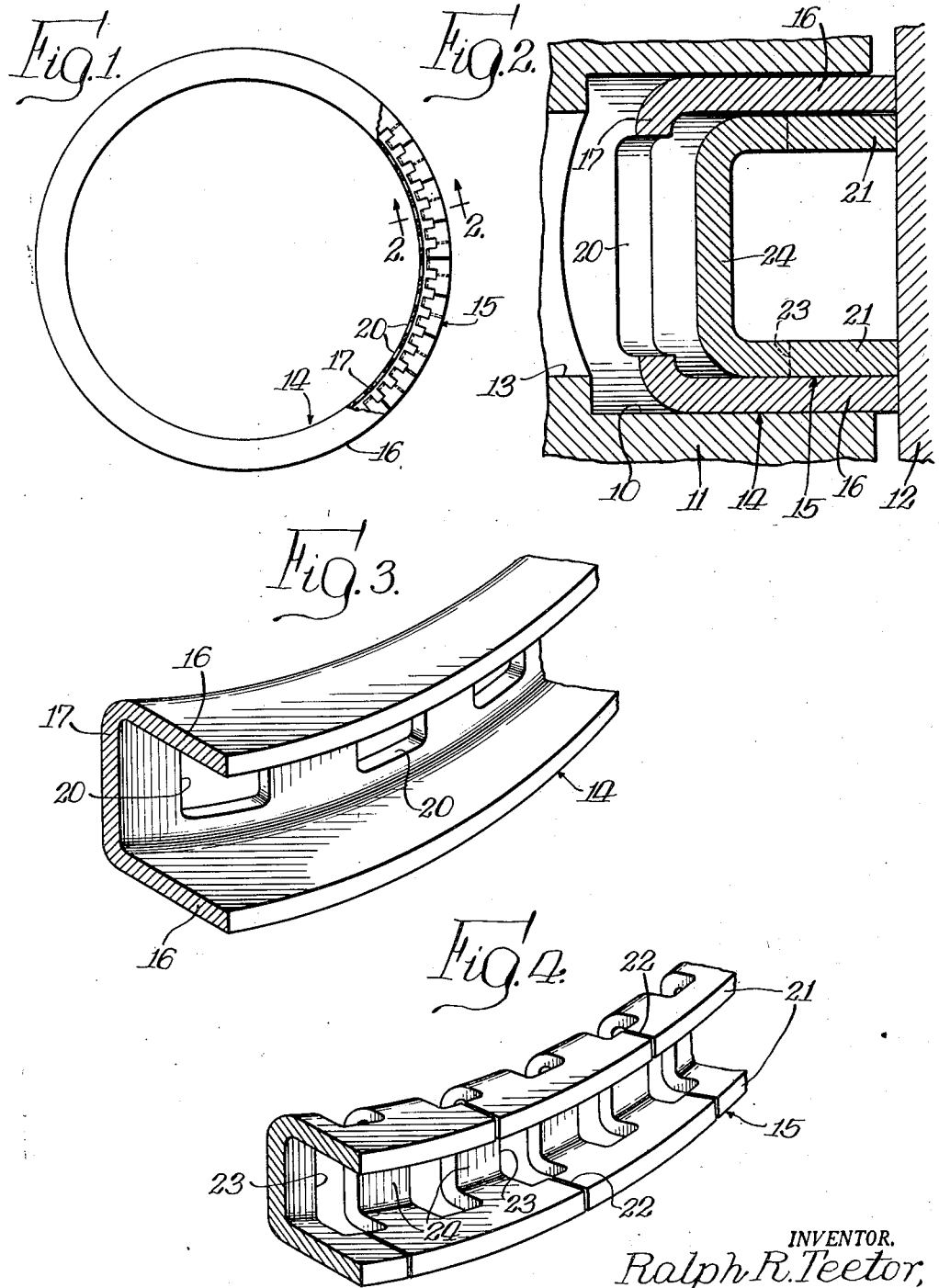

2,606,800

UNITED STATES PATENT OFFICE 2,606,800

PISTON RING

Ralph R. Teetor, Hagerstown, Ind., assignor to Perfect Circle Corporation, Hagerstown, Ind., a corporation of Indiana Application November 4, 1947, Serial No. 783,945

9 Claims. (Cl. 309—45)

1

The invention relates generally to piston rings for internal combustion engines or the like and more particularly to a piston ring of the type known as an "oil ring."

The general object of the invention is to provide a novel piston ring structure which is particularly adapted to control oil conditions in an engine cylinder.

Another important object is to provide a novel piston ring combining in one structure the functional features of two separate rings, thus reducing the number of rings required on a piston and consequently permitting a reduction in the length and weight of the piston.

A further object is to provide a novel piston ring structure adapted for effective control of oil at all engine speeds.

Other objects will become apparent from the following description taken in connection with the accompanying drawings, in which:

Figure 1 is a plan view, with portions broken away, of a ring structure embodying the features of the invention.

Fig. 2 is an enlarged transverse sectional view taken substantially on the line 2—2 of Fig. 1 and showing the relation thereof with the cylinder and piston.

Fig. 3 is a fragmentary perspective view of one part of the ring structure shown in Fig. 1.

Fig. 4 is a fragmentary perspective view of another part of the ring structure.

Fig. 5 is a view similar to Fig. 2 but showing a modified form of ring structure.

Fig. 6 is a perspective view of a portion of one of the parts of the ring structure shown in Fig. 5.

Fig. 7 is a transverse sectional view, similar to Figs. 2 and 5, of another modified form of ring structure.

Fig. 8 is a perspective view of a portion of one of the parts of the ring structure shown in Fig. 7.

Fig. 9 is a plan view of the part shown in Fig. 8.

In internal combustion engines, several piston rings are usually employed on each piston. Certain of the rings function to maintain compression within the cylinder while others serve to control the flow of oil and prevent passage thereof from the crankcase into the combustion chamber portion of the cylinder. It has been found that different types of oil rings function better at certain speeds than at other speeds. Thus, certain types of rings may properly control the flow of oil for average and high speeds but permit too great a flow of oil into the cylinder at idling speeds. Rings of other characteristics may function properly for idling and low speeds and be totally inadequate in the case of higher speeds. To obtain complete control at all speeds, two or more oil rings of different expansion characteristics may be employed on a piston. Such an arrangement, however, obviously requires space on the upper end of the piston for the grooves in which the rings are seated.

The present invention contemplates a ring structure adapted to control oil conditions throughout the entire range of speeds, with a ring structure such as may be positioned within a single groove in the piston. With such an arrangement, the piston may obviously be made shorter and its weight reduced as a consequence. The ring structure herein disclosed comprises generally a pair of ring members mounted one within the other, with the outer ring member dimensioned to fit within an ordinary ring groove in the piston. The two ring members are so interrelated that they may expand independently of each other so that each may perform its proper function. Thus each of the modifications shown in the drawings comprises a pair of ring members, one being mounted within the other and each having cylinder-engaging portions and being expansible independently of each other.

In the form of the ring structure shown in Figs. 1 to 4, inclusive, such structure is adapted to be positioned within a ring-receiving groove 10 (see Fig. 2) of usual size, formed in a piston fragmentarily shown at 11, the cylinder also being fragmentarily shown at 12. The ring groove particularly shown in this figure is rectangular in cross-section and is provided with apertures 13 at the bottom or back of the groove by which oil may be drained back to the crankcase of the engine through the interior of the piston.

The ring structure shown in these figures comprises an outer member indicated generally at 14 and an inner member indicated generally at 15. The outer member 14, in the present instance, comprises a sheet metal ring of channel-shaped cross section, providing a pair of cylinder-engaging flanges 16 connected at their inner periphery by a web portion 17. The outer member 14 is dimensioned with sufficient clearance relative to the width of the groove so that it may freely expand therein and is spaced from the rear or bottom of the groove 10. Apertures 20 of any desired shape, size and spacing may be placed in the web portion 17 to provide for flow of oil therethrough to the apertures 13 in the piston. In the present instance, the apertures 20 are illustrated as generally rectangular in form and of less axial height than the height of the web portion 17. A ring member of this character may be readily made of sheet metal by first punching the apertures 20 therein and then folding the strip along longitudinal lines into the channel-shaped form and bending the resultant structure into a ring.

The inner ring member 15, in this instance, is also illustrated as being of sheet metal construction and comprises a pair of axially spaced cylinder-engaging flanges 21 which, in this instance, are divided into segments by radial slits 22. The ring member 15 may be said to be channel-shaped in cross section, and the web portion thereof, in the present instance, is slotted as at 23 to provide a plurality of circumferentially spaced web members 24. The inner member 15 is thus circumferentially expansible. The slots 23 provide for passage of oil to the apertures 20 in the outer member 15, and in the present instance, the slots 23 are shown as extending into the flange or rail portions 21 of the ring member. The radial width of the inner member 15 is less than the internal radial depth of the outer member 14 so that the two can expand relative to each other. The axial thickness of the inner member 15 is such that it fits within the outer member with substantially the same clearance as the outer member has in the ring groove 10.

With the foregoing structure, the ring member 15, when given its arcuate shape, will have small gaps at the slits 22 through which oil may pass. While the slits 22 are in staggered relation in the respective flanges, as is apparent in Fig. 4, some passage of oil through such gaps might occur, were the inner ring member 15 used alone. However, such gaps are obviously sealed against any material flow of oil therethrough by the cylinder-engaging flanges or rails 16 of the outer member, since the latter-mentioned rails are unbroken throughout their length. Thus, the two members will adequately control the flow of oil while the members being of different structure obviously will have different expansion characteristics and will function differently at different speeds. With the particular combination of the structures of the two ring members herein shown, adequate control of oil is obtained throughout the entire range of engine speeds.

In the modified form shown in Figs. 5 and 6, a different combination of ring members is disclosed. Thus, in the ring structure shown in these two figures, I provide an outer ring member 14 of the same construction as that shown in the previous figures. The inner ring member, in this instance, however, differs. The inner ring member, indicated generally at 30, is made of sheet metal and comprises a pair of cylinder-engaging flanges 31 connected by a web portion, indicated generally at 32. The inner periphery of the inner ring 30 is spaced from the web portion 17 of the outer ring to provide for independent expansion of the two rings. The web portion 32, in this instance, gives added stiffness to the ring member and, to this end, is reversely bent into the space between the rails 31. Thus, the web portion comprises reverse bends 33 and a central curved portion 34 extending outwardly into the space between the rails. The curved portion 34 is preferably provided with apertures 35 to permit flow of oil therethrough to the apertures 20 in the outer ring member. The apertures 35, in this instance, are shown as round but may, of course, be of any desired shape, size and spacing. The size and spacing of the apertures 35 to some degree control the stiffness of the ring since they may vary the amount of metal remaining in the web portion 32.

In making the inner ring member 30, a strip of sheet metal is employed and the apertures 35 are first punched therein. The strip is then folded along longitudinal lines to provide the cross-sectional shape shown in the drawings and is bent into its annular form. Because of the difference in structure of the inner and outer ring members in this instance, the two will obviously have different expansion characteristics and together will function to control oil conditions for all engine speeds.

In the modified form shown in Fig. 7, I again employ an outer ring member 14 of the same construction as shown in the other two sets of figures with the cylinder contacting flanges 16, web portion 17 and apertures 20 therein. The inner ring member, indicated generally at 40, in this instance, is of the cast iron variety and comprises a ring which is generally rectangular in cross-sectional form, but is beveled at its outer corners, as at 41. In the central portion of its outer periphery, the ring member 40 is curved as at 42, thus providing a pair of cylinder-engaging flanges 43 which are axially spaced from each other and from the flanges 16 of the outer ring member. The inner ring member 40, of course, is dimensioned to fit within the outer ring member for independent expansion thereof with the inner periphery of the ring member 40 spaced from the web portion 17 of the outer ring member. To provide for flow of oil through the ring structure, the outer ring member is milled to provide radially extending slots 44 extending therethrough.

With each of the three forms described, I have provided a piston ring structure comprising two independently expansible ring members with one member mounted within the other so that the complete structure can be positioned within a single ring groove in the piston. Each of these structures provides for full control of oil for all engine speeds and thus reduces the necessity of additional rings for oil control on the piston. In the form of ring shown in Figs. 1 to 4, the inner ring is of a type which is circumferentially expansible by virtue of the segmental construction of the flanges thereof. The gaps between such segments, however, are sealed by the rails 16. In this instance, the rails 16 are connected by the web portion 17 so that the outer ring member embraces the inner ring member.

I claim:

1. A piston ring structure adapted to be seated in a groove in the piston, comprising a ring member dimensioned to fit in the groove and having a channel-shaped cross section providing a pair of axially spaced and integrally connected cylinder-engaging flanges, and a second one piece ring member having an axial dimension substantially equal to the space between said flanges to fit within the first ring member and having a pair of axially spaced cylinder-engaging flanges and expansible independently of said first member.

2. A piston ring structure adapted to be seated in a groove in the piston, comprising a pair of independently expansible ring members with one member dimensioned to fit within the groove and the other member embraced by and dimensioned to fit within the one member, each member having a pair of integrally connected axially spaced cylinder-engaging flanges, one member being circumferentially expansible and the other member having a single gap and a fixed circumferential length whereby the two members have different expansion characteristics, the flanges of one member engaging the respective flanges of the other member.

3. A piston ring structure adapted to be seated in a groove in the piston, comprising a ring member of channel-shaped cross section dimensioned to fit within the groove with its flanges adapted to engage the cylinder wall and having the web portion connecting said flanges provided with apertures for the passage of oil, and a second ring member having an axial dimension substantially equal to the space between said flanges to fit within the first ring member and radially spaced from the web portion of the first ring member to permit the two ring members to expand independently of each other, said second ring member having a pair of integrally connected axially spaced cylinder-engaging flanges and being provided with radial apertures for conducting oil to the apertures in the first ring member.

4. A piston ring structure adapted to be seated in a groove in the piston, comprising a ring member comprising a pair of axially spaced cylinder-engaging flanges, each flange comprising a plurality of segments separated by gaps, and a second ring member of channel-shaped cross section having a pair of cylinder-engaging rails engaging the respective flanges of the first ring member and sealing the gaps between the segments.

5. A piston ring structure adapted to be seated in a groove in the piston, comprising a pair of sheet metal ring members of channel-shape cross section with one member positioned within the other, the inner member having segmental flanges with gaps between the segments and the outer member having circumferentially continuous flanges with a single gap and sealing said first mentioned gaps.

6. A piston ring structure adapted to be seated in a groove in the piston, comprising a pair of sheet metal ring members of channel-shape cross section with one member positioned within the other, each member comprising a pair of axially spaced cylinder-engaging flanges integrally connected by an axially extending web portion, the flanges of one member engaging the respective flanges of the other member and the web portions of both members being apertured to permit the flow of oil therethrough.

7. A piston ring structure adapted to be seated in a groove in the piston, comprising a pair of sheet metal ring members of channel-shape cross section with one member positioned within the other, each member comprising a pair of axially spaced cylinder-engaging flanges connected by a web portion, the web portion of the inner member being reversely bent to extend between the flanges and the web portion of the outer member extending substantially axially to provide different expansion characteristics for the respective members.

8. A piston ring structure adapted to be seated in a groove in the piston, comprising a sheet metal ring member of channel-shape cross section and having a pair of cylinder-engaging flanges integrally connected by an axially extending web portion, and a cast-iron ring member positioned within the sheet metal ring member and peripherally grooved to provide a pair of cylinder-engaging flanges, said cast-iron member having radial slots and the web portion and said sheet metal ring member having radial apertures for the passage of oil from the peripheral groove in the former.

9. A piston ring structure adapted to be seated in a groove in the piston, comprising a sheet metal ring member of channel-shape cross section and having a pair of axially spaced cylinder-engaging flanges integrally connected by a web portion, and a cast-iron ring member positioned within the sheet metal ring member and having its outer periphery beveled at both sides and grooved to provide a pair of cylinder-engaging flanges spaced from each other and spaced from the adjacent flanges of the sheet metal ring member.

RALPH R. TEETOR.

REFERENCES CITED

The following references are of record in the file of this patent:

UNITED STATES PATENTS

| Number | Name | Date |
| --- | --- | --- |
| 2,148,997 | Phillips | Feb. 28, 1939 |
| 2,254,753 | Phillips | Sept. 2, 1941 |
| 2,274,805 | Phillips | Mar. 3, 1942 |
| 2,317,580 | Bauer | Apr. 27, 1943 |
| 2,398,030 | Morton | Apr. 19, 1946 |
| 2,443,065 | Bowers | June 8, 1948 |